(12) United States Patent
Schade

(10) Patent No.: US 8,926,847 B1
(45) Date of Patent: Jan. 6, 2015

(54) GARNET EXTRACTION SYSTEM AND METHOD FOR USING THE SAME

(71) Applicant: George Schade, Fullerton, CA (US)

(72) Inventor: George Schade, Fullerton, CA (US)

(*) Notice: Subject to any disclaimer, the term of this patent is extended or adjusted under 35 U.S.C. 154(b) by 0 days.

(21) Appl. No.: 14/284,646

(22) Filed: May 22, 2014

Related U.S. Application Data

(63) Continuation-in-part of application No. 12/623,280, filed on Nov. 20, 2009.

(51) Int. Cl.
| | | |
|---|---|---|
| B01D 21/00 | (2006.01) | |
| B01D 21/24 | (2006.01) | |
| B24C 9/00 | (2006.01) | |
| B08B 3/02 | (2006.01) | |
| B08B 9/093 | (2006.01) | |

(52) U.S. Cl.
USPC ...... 210/805; 210/167.01; 210/523; 210/803; 15/1.7; 134/22.18; 209/138; 451/38

(58) Field of Classification Search
None
See application file for complete search history.

(56) References Cited

U.S. PATENT DOCUMENTS

| | | | | |
|---|---|---|---|---|
| 1,842,043 A | * | 1/1932 | Modra et al. | 417/177 |
| 2,010,540 A | * | 8/1935 | Evans | 134/10 |
| 2,044,088 A | * | 6/1936 | Lord | 417/151 |
| 2,647,639 A | * | 8/1953 | Grein | 210/232 |
| 3,810,604 A | * | 5/1974 | Reiter | 366/138 |
| 3,953,226 A | * | 4/1976 | Emond et al. | 134/104.4 |
| 4,943,211 A | * | 7/1990 | Boegh | 417/181 |
| 4,945,933 A | * | 8/1990 | Krajicek et al. | 134/167 R |
| 4,963,073 A | * | 10/1990 | Tash et al. | 417/181 |
| 5,078,799 A | * | 1/1992 | Matter et al. | 134/22.18 |
| 5,129,167 A | * | 7/1992 | Nakahara | 37/318 |
| 5,472,517 A | * | 12/1995 | Laberge | 134/21 |
| 5,578,220 A | * | 11/1996 | Becktold | 210/747.9 |
| 6,517,320 B1 | * | 2/2003 | Reynolds | 417/152 |
| 6,805,618 B1 | * | 10/2004 | Ward et al. | 451/87 |
| 6,863,807 B2 | * | 3/2005 | Crawford, III | 210/170.09 |
| 7,507,298 B2 | * | 3/2009 | Falster-Hansen et al. | 134/21 |
| 8,153,001 B2 | * | 4/2012 | Peters | 210/232 |
| 8,157,925 B1 | * | 4/2012 | Templin | 134/166 R |
| 8,679,335 B1 | * | 3/2014 | Dufort | 210/241 |
| 2004/0057839 A1 | * | 3/2004 | Crawford, III | 417/87 |
| 2004/0238009 A1 | * | 12/2004 | Falster-Hansen et al. | 134/22.1 |
| 2010/0133206 A1 | * | 6/2010 | Schade | 210/805 |
| 2011/0062091 A1 | * | 3/2011 | Peters | 210/808 |

* cited by examiner

*Primary Examiner* — Robert James Popovics
(74) *Attorney, Agent, or Firm* — Richard G. Eldredge

(57) ABSTRACT

A method for using an extractor system to extract particulate material from a liquid tank includes inserting a first conduit into a liquid tank; inserting an outflow line into the liquid tank, the outflow line comprising one or more nozzles having a distal end; inserting an inflow line into the liquid tank, the inflow line comprising a collector having a distal end, the collector and the one or more nozzles being proximate each other; and operating the pump to pump liquid from an extractor tank through an outflow line out of the one or more nozzles to unsettle the particulate material, the particulate material drawn through the collector and the inflow line into the extractor tank without passing through the pump.

5 Claims, 15 Drawing Sheets

GARNET EXTRACTION SYSTEM AND METHOD FOR USING THE SAME

BACKGROUND

1. Field of the Invention

The present invention relates to a system for extracting a particulate material (e.g., an abrasive material such as garnet) from a body of liquid, and in particular to a closed-loop system for extracting a particulate material (e.g., garnet) from a receptacle EHC tank of a water jet cutter into which the particulate is delivered following a cutting operation.

2. Description of Related Art

Water jet cutters produce high pressure jets of water containing abrasive particles to cut a variety of materials (e.g., metals, stone, ceramics, etc.). The water jet with the abrasive material (e.g., garnet) is discharged by the water jet cutter at high pressures via a water jet nozzle. However, before the water jet is discharged, an abrasive particulate such as garnet particles are added to facilitate the cutting of the material. The water jet containing the abrasive particulate is ejected through the water jet nozzle onto a work piece, and the water jet containing the abrasive particulate passes through the work piece into a collection or extraction EHC tank below the water jet nozzle.

One challenge with using water jet cutters is how to remove the abrasive material from the extraction or water jet EHC tank after a water jet cutting operation. One known manner for doing so involves "sweeping" the bottom of the catch EHC tank by directing a flow of the water and abrasive particulate slurry into a centrifugal filtration system. The centrifugal filtration system separates out the particulate from the water by pumping the particulate slurry through a centrifugal separator. A catch basin collects the used particulate and the separated water substantially relieved of the abrasive particulate can then be disposed of or re-circulated into the catch EHC tank to repeat the process of sweeping the abrasive particulate slurry into the centrifugal filtration system.

However, due to the abrasive character of the particulate the water and particulate slurry is abrasive and can damage the particulate filtration system, including the pump used to draw the particulate slurry from the catch EHC tank through the pump and to push the liquid and abrasive through the filtration system (especially in areas around seals of the pump).

Additionally, systems for removing abrasive material from a catch or extraction EHC tank of a water jet cutter are bulky and heavy. Moreover, such systems are usually connected via rigid piping to a water jet cutter and cannot be readily used with more than one cutter. Accordingly, there is a need for an improved system for removing abrasive materials (e.g., garnet) from a water EHC tank, such as a catch or extraction EHC tank of a water jet cutter.

Although great strides have been made in the area of systems for removing abrasive material, many shortcomings remain.

SUMMARY OF THE INVENTION

In accordance with one embodiment, a system for extracting a particulate material from a body of liquid is provided. The system includes an extraction holding chamber (EHC) tank with a top end and a bottom end, and a pump operatively coupled to the EHC tank via one or more valves. An outflow line coupled to the pump and having an outflow opening can be placed in fluid communication with the body of liquid. The system also includes an inflow line coupled to the EHC tank and having an inflow opening. At least a portion of the inflow line is proximate to the outflow line, so that the inflow opening and the outflow opening are proximate each other. The inflow line, the outflow line, and the EHC tank define a closed loop. The pump is configured to pump liquid from the EHC tank, once the EHC tank has been filled with liquid, to the body of liquid via the outflow line to unsettle the particulate material in the body of liquid, the pump configured to draw a generally equal amount of liquid and particulate material into the EHC tank via the inflow line without the particulate material passing through the pump, said particulate material collected in the EHC tank.

In accordance with another embodiment, a method for using an extraction system to extract particulate material from a liquid EHC tank is provided. The method includes inserting a first conduit into a liquid EHC tank, the first conduit coupled to a pump via a three-way valve. The method also includes inserting an outflow line into the liquid EHC tank, the outflow line comprising one or more nozzles having a distal end, and inserting an inflow line into the liquid EHC tank, the inflow line comprising a collector having a distal end, the collector and the one or more nozzles being proximate each other. The method also includes operating the pump to pump liquid from an extraction EHC tank through an outflow line out of the one or more nozzles to unsettle the particulate material, the particulate material drawn through the collector and the inflow line into the extraction EHC tank without passing through the pump. The inflow line, the outflow line, and the extraction EHC tank define a closed system.

In yet another embodiment, a system for extracting a particulate material from a water jet EHC tank that holds particulate material from a water jet cutting operation is provided. The system includes a EHC tank, and a pump operatively coupled to the EHC tank. An outflow line coupled to the pump and having an outflow opening can be placed in fluid communication with the water jet EHC tank. The system also includes an inflow line coupled to the EHC tank and having an inflow opening. At least a portion of the inflow line is proximate to the outflow line so that the inflow line and the outflow line are proximate each other. The inflow line, the outflow line, and the EHC tank define a closed loop. The pump is configured to pump liquid from the EHC tank to the water jet EHC tank via the outflow line to unsettle the particulate material in the water jet EHC tank, the pump configured to draw a generally equal amount of water and particulate material into the EHC tank via the inflow line without the particulate material passing through the pump.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
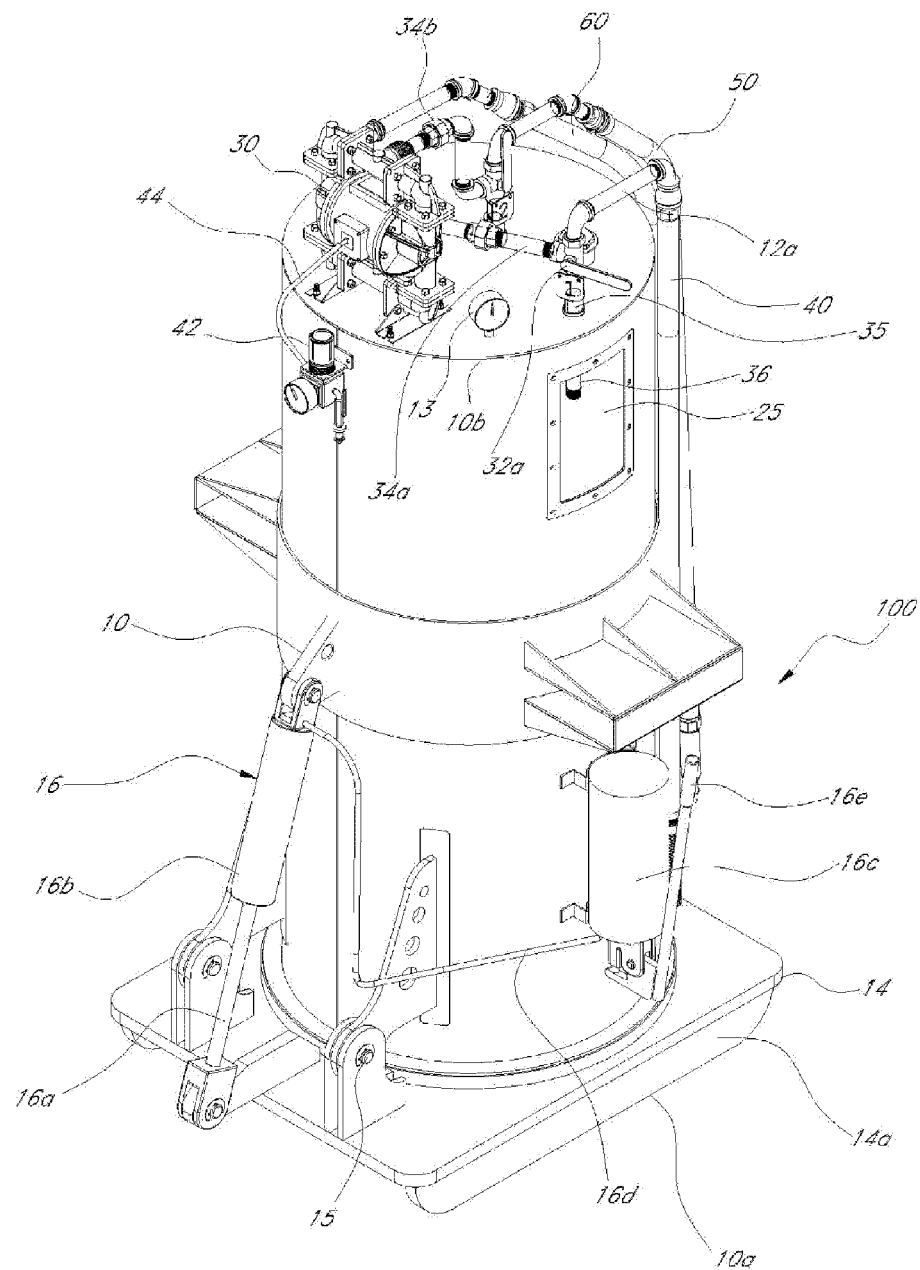
FIG. 1 is a perspective view of one embodiment of a system for extracting a particulate material from a body of liquid.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

In the following detailed description, terms of orientation such as "top," "bottom," "upper," "lower," "front," "rear," and "end" are used herein to simplify the description of the context of the illustrated embodiments. Likewise, terms of sequence, such as "first" and "second," are used to simplify the description of the illustrated embodiments. Because other orientations and sequences are possible, however, the present invention should not be limited to the illustrated orientation. Those skilled in the art will appreciate that other orientations of the various components described above are possible.

FIG. 1 illustrates one embodiment of a system 100 for extracting a particulate material (e.g., abrasive particulate material) from a body of liquid (e.g., water). The system 100 can be used to extract garnet from a catch or extraction EHC tank (e.g., water jet EHC tank) of a water jet cutter. However, one of ordinary skill in the art will recognize that the system 100 can be used to extract other particulate matter (e.g., other abrasive materials) from a body of liquid, and is not limited to the extraction of garnet or abrasive material from a catch EHC tank or water jet EHC tank of a water jet cutter.

In the illustrated embodiment, the system 100 includes an extraction EHC tank 10. In one embodiment, the EHC tank 10 can have a cylindrical shape and be between about 4-7 feet tall and between about 16 and 48 inches in diameter. In another embodiment, the EHC tank 10 can have a cylindrical shape and be about 5 feet tall and about 27 inches in diameter. However, the EHC tank 10 can have other suitable cross-sectional shapes (e.g., square, oval) and dimensions. In one embodiment, the EHC tank 10 is made of steel (e.g., carbon steel), or other suitable materials.

As best shown in FIG. 1, the extracting system 100 can include a bottom door 14 movably coupleable to the EHC tank 10. In the illustrated embodiment, the door 14 is coupled to a bottom end 10a of the EHC tank 10. A coupling mechanism 16 couples the door 14 to the EHC tank 10. The coupling mechanism 16 allows movement of the bottom door 14 relative to the EHC tank 10, where the bottom door 14 may include one or more support members or sleds 14a. In one embodiment, the door 14 can be coupled to the EHC tank 10 via a hinge unit 15 that allows the door 14 to pivot relative to the bottom end 10a of the EHC tank 10. In the illustrated embodiment, the bottom door 14 can be moved between an open position away from the bottom end 10a of the EHC tank 10 to a closed position adjacent the bottom end 10a of the EHC tank 10.

The coupling mechanism 16 can also include an actuation mechanism 16a that facilitates the movement of the bottom door 14 between said open and closed positions relative to the bottom end 10a of the EHC tank 10. In one embodiment, the actuation mechanism 16a can be a hydraulic assembly that can include a hydraulic cylinder 16b in fluid communication with a hydraulic pump 16c via a fluid line 16d. In the illustrated embodiment, the hydraulic pump 16c can be manually operated via a pressure release valve 16e to actuate the hydraulic cylinder 16b to move the bottom door 14 between the open position and the closed position relative to EHC tank 10. In another embodiment, the hydraulic pump 16c can be actuated electronically (e.g., using a computer controller). In still another embodiment, the actuation mechanism 16a can be a pneumatic system. In yet another embodiment, the actuation mechanism 16a can include an electric motor that operates a drive mechanism to move the door 14 relative to the EHC tank 10. However, the actuation mechanism 16a can have other configurations.

Figure 2:
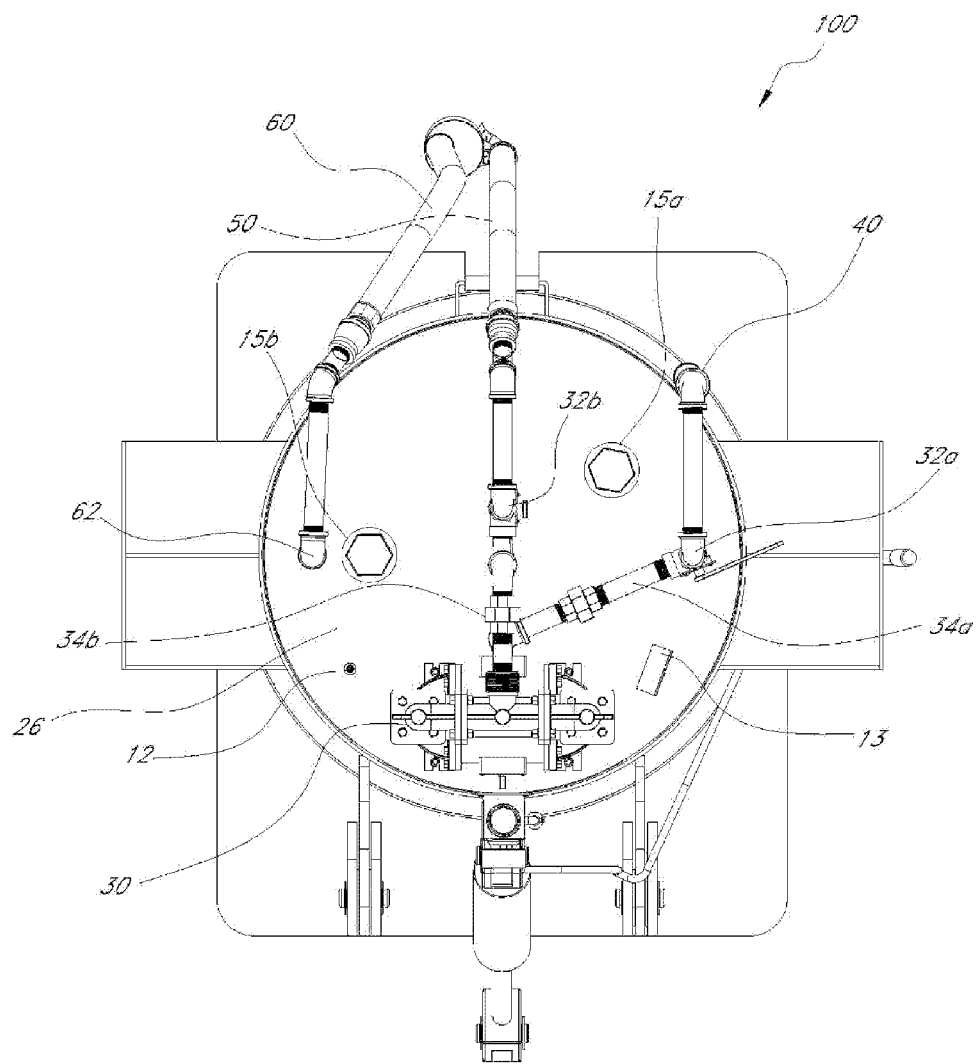
FIG. 2 is a top view of the extraction system of FIG. 1.

With reference to FIGS. 1 and 2, the extracting system 100 can also include a pump 30, such as a diaphragm pump. However, other suitable pumps can be used. In the illustrated embodiment, the pump 30 can be mounted to a top end 10b of the extraction EHC tank 10. However, in another embodiment, the pump 30 can be mounted to the EHC tank 10 at another location, or can be separate from (e.g., unmounted on) the EHC tank 10. In one embodiment, the pump 30 can be an air powered diaphragm pump, such as model number 4157K844 by McMaster Carr. However, other suitable pump types can be used.

With continued reference to FIGS. 1 and 2, the pump 30 can be in fluid communication with first and second valves 32a, 32b, where the pump 30 is coupled to the first valve 32a via a first fluid line 34a and coupled to the second valve 32b via a second fluid line 34b. In one embodiment, the valves 32a-32b are preferably three-way valves known in the art. Suitable valves 32a-32b are manufactured by McMaster Carr, such as 3-way, four position valve model 45695K35. However, the valves 32a-32b can be other suitable valve types. The fluid lines 34a, 34b can in one embodiment include flexible tubing or hoses (e.g., rubber hoses). In another embodiment, the fluid lines 34a, 34b can include rigid pipe portions including one or more manifold pipes, tubes, and turns.

The system 100 can have a EHC tank 10 with at least one aperture 25 that allows a user to look into the EHC tank 10, for example, to look at the contents of the EHC tank 10 (e.g., the level of abrasive material in the EHC tank 10). The aperture 25 can be covered with glass, poly carbonate, or other transparent or translucent material that allows a user to see the inside of the EHC tank 10.

The first valve 32a is preferably coupled to a first flow passage 36 using a coupling 35 that extends through the top end 10b into the EHC tank 10. The first flow passage 36 can in one embodiment be a flexible hose portion commonly available in the art. In another embodiment, the first flow passage 36 can be a rigid pipe portion. The first flow passage 36 can in one embodiment have a one-inch diameter. However, the first flow passage 36 can have other suitable sizes.

Figure 6:
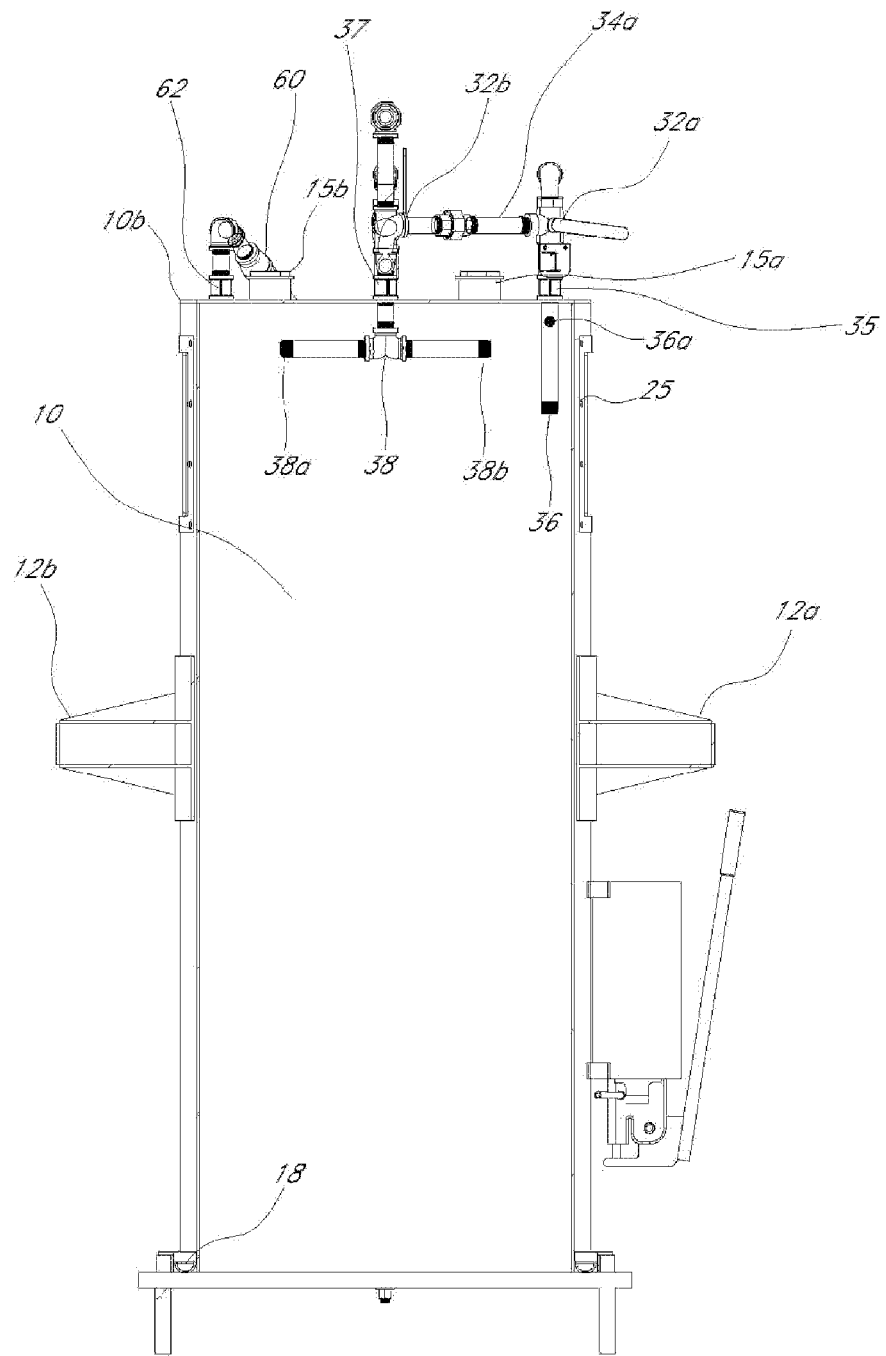
FIG. 6 is a cross-sectional view taken along line 6-6 in FIG. 3.

The second valve 32b is preferably coupled via a coupling 37 to a second flow passage 38 (see FIG. 6) that extends through the top end 10b into the EHC tank 10. The second flow passage 38 used to pre-charge or fill tank 10 and can be a T-junction with outlet passages 38a, 38b, as illustrated in FIG. 6. The second flow passage 38 can in one embodiment be a flexible hose portion commonly available in the art. In another embodiment, the second flow passage 38 can be a rigid pipe portion. The second flow passage 38 can in one embodiment have a one-inch diameter. However, the second flow passage 38 can have other suitable sizes.

In FIGS. 1 and 2, the extracting system 100 can include an air pressure regulator 42 and an air supply hose 44 coupled to the pump 30. In one embodiment, the air pressure regulator 42 is mounted on the EHC tank 10, or can be separate (e.g., unmounted) from the EHC tank 10. The air supply hose 44 may be a flexible hose portion commonly available in the art. An air supply system can be coupled to the air pressure regulator 42 in any way known in the art (e.g., quick release coupling between an air supply hose and the air pressure regulator 42).

Additionally, the extracting system 100 can in one embodiment have a pressure relief valve 12 and pressure gauge 13 coupled to the EHC tank 10. The pressure gauge 13 allows the user to measure the amount of air pressure in the EHC tank 10. The pressure gauge 13 in one embodiment can be mounted on the top end 10a of the EHC tank 10, but can be mounted at another location. Additionally, the EHC tank 10 can have a pressure relief valve 12 to release air from the EHC tank 10 to ensure a constant vacuum during operation.

As best shown in FIG. 2, the top end 10b of EHC tank 10 also shows removable caps 15a, 15b. Removable caps 15a, 15b may in one embodiment have threaded regions to screw onto the corresponding openings on the top end 10b so as to provide a generally airtight seal. Other suitable caps known in the art that can couple to the EHC tank via other suitable mechanisms (e.g., latches) that provide an airtight seal may be used. In one embodiment, when precharging the EHC tank 10, caps 15a, 15b are preferably fastened onto the openings of top end 10b. Caps 15a, 15b may be removed following the completion of the extracting process to allow excess water to be removed from the EHC tank 10, as described further below.

Figure 3:
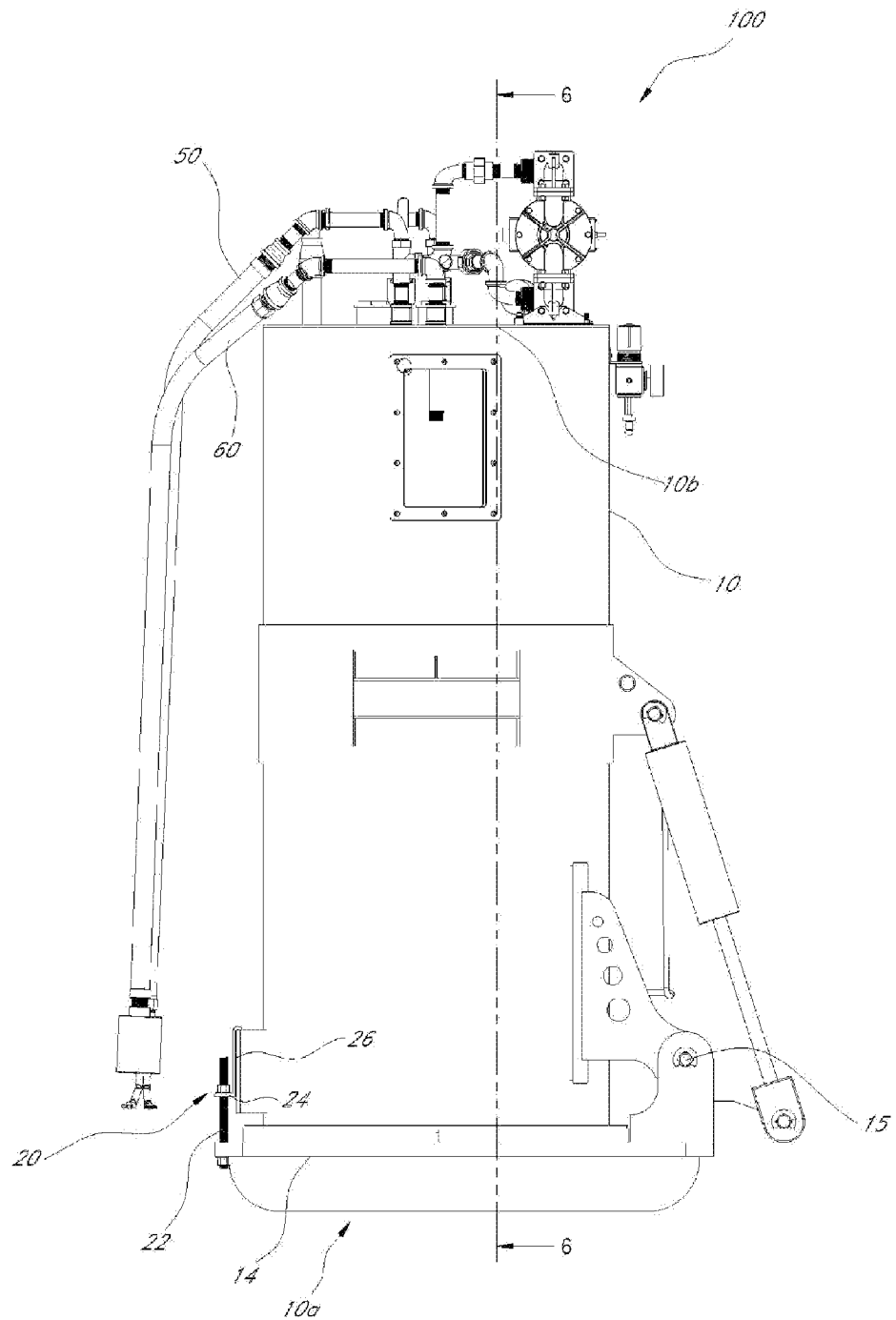
FIG. 3 is a side view of the extraction system of FIG. 1.

In FIG. 3, when the bottom door 14 is in the closed position, the bottom door 14 can be locked in the closed position via a locking mechanism 20. The locking mechanism 20 can include one or more mechanisms for fastening the bottom door 14 to the bottom end 10a of the EHC tank 10. In the illustrated embodiment, the locking mechanism 20 can include a locking member 22 (e.g., a hook, pin, bolt, or flange of the locking member 22) attached to the bottom door 14 via a slot (not shown) in the door 14 and a latch 24 (e.g., a Bombay door pivot hook latch) that can be releasably coupled to the locking member 22 by a nut to fix the position of the bottom door 14 in the closed position. The mechanism 20 can include a support plate 26 attached to the EHC tank 10, coupled to locking member 22 via latch 24. In one embodiment, the support plate 26 can be bolted to the EHC tank 10. In another embodiment, the support plate 26 can be welded to the EHC tank 10. In the illustrated embodiment, the locking mechanism 20 includes a latch 24 that can be removably coupled to the EHC tank 10. Additionally, the locking member 22 can be a bolt secured to the bottom door 14 via a lockout. However, the locking mechanism 20 can have other suitable configurations, such as a hinged locking mechanism. Advantageously, the bottom door 14 can be selectively locked when, for example, the EHC tank 10 is being filled with water and/or particulate material, but can be selectively unlocked to facilitate the disposal of the particulate material stored in the EHC tank 10, for example, at a dump site. This allows the easy disposal of the particulate (e.g., garnet) material.

Figure 4:
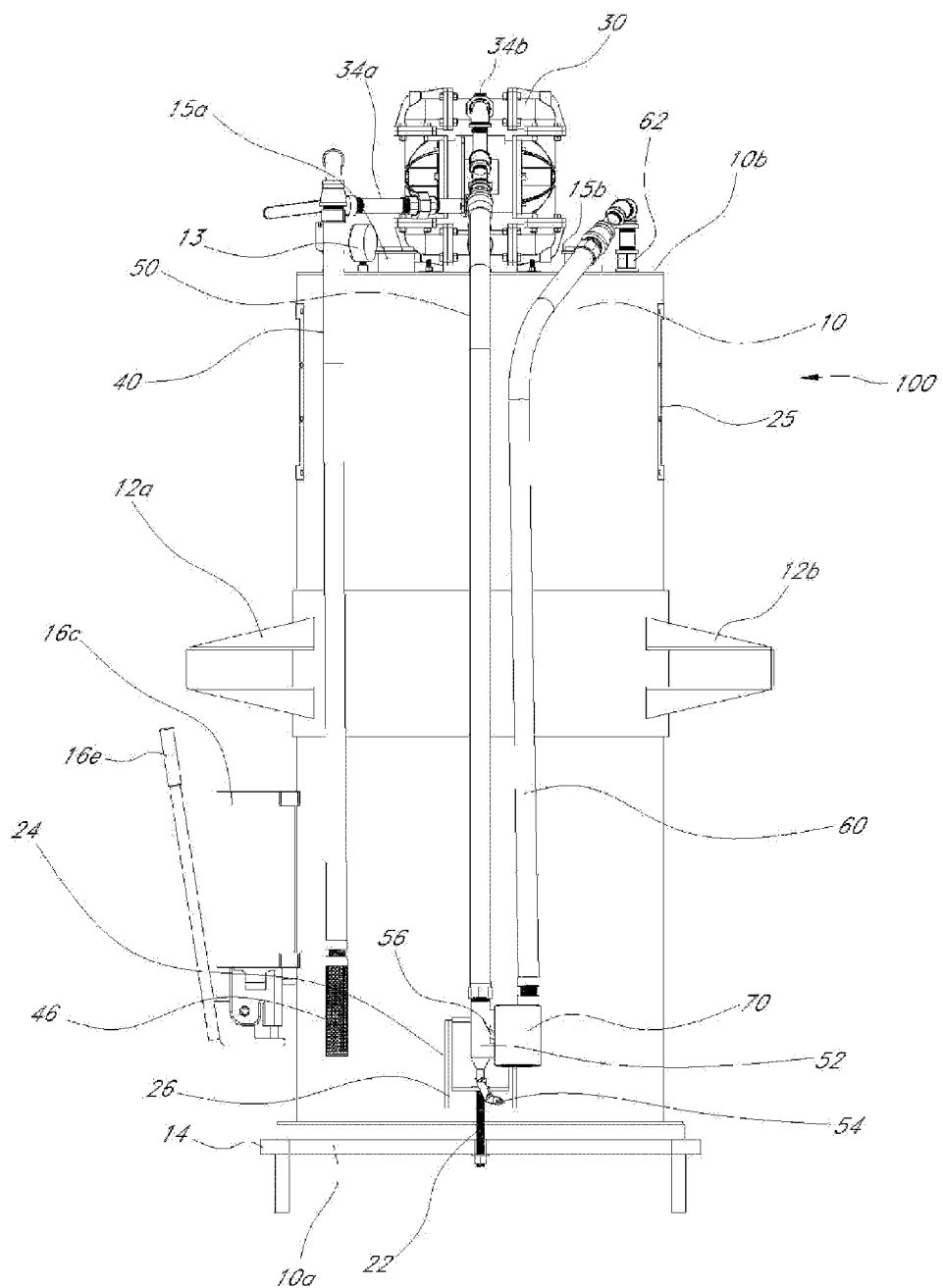
FIG. 4 is a front view of the extraction system of FIG. 1.

In FIG. 4, the extraction system 100 includes a first flow line 40 removably coupled to the EHC tank 10 at the top end 10b thereof. In the illustrated embodiment, the flow line 40 can be coupled to the EHC tank 10 via first valve 32a. The flow line 40 can be used to remove excess water from tank 10 after the chamber is full of garnet and prior to dumping and to fill or pre-charge the EHC tank 10 with a liquid (e.g., water) from a water jet EHC tank or other body of liquid. The system 100 also includes a second flow line 50 operatively coupled to the pump 30 via the second valve 32b that can be used to direct a fluid from the EHC tank 10, through the pump 30 to a water jet EHC tank or other body of liquid. A third flow line 60 can be removably coupled to the EHC tank 10 via coupling 62 and can direct fluid and abrasive material from a water jet EHC tank or other body of liquid to the EHC tank 10, as further described below. The flow lines 40, 50, 60 can each include one or more sections, where each section can have a length of about five feet. However, in other embodiments, the sections can have other suitable lengths, as needed for the desired extraction application.

With continued reference to FIG. 4, the second flow line 50 includes an injector head 52 with a nozzle unit 54 attached at a distal end that directs fluid flow out of the second flow line 50 in a desired direction. In a preferred embodiment, injector head 52 includes one or more nozzles. Upon beginning of the extraction process, the pump 30 pumps water from the extraction EHC tank 10 via the first flow passage 36, first fluid line 34a into pump 30 and discharged through 34B into hose 50, and second flow line 50 into a water jet EHC tank, so that the water flow is delivered via the injector head 52 and the nozzle unit 54 onto the particulate material (e.g., abrasive material, such as garnet) and unsettles the particulate material in the water jet EHC tank.

Figure 5A:
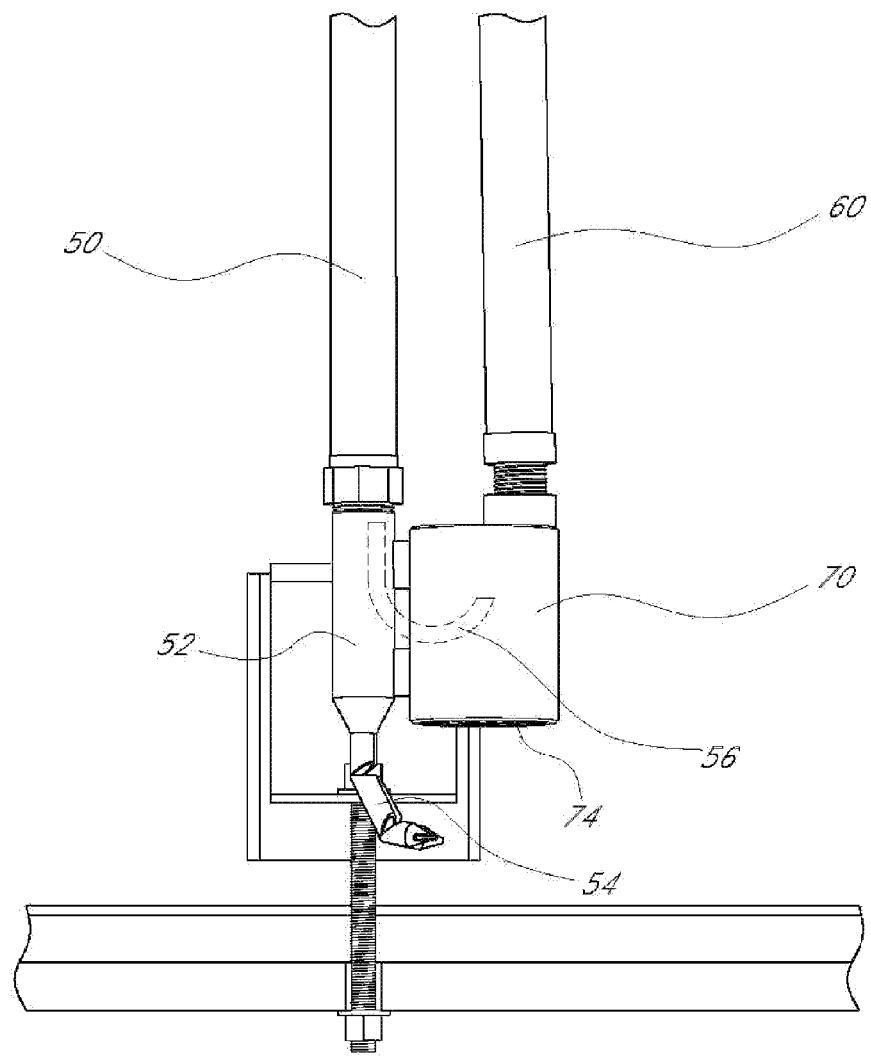
FIG. 5A is an enlarged cross-sectional view of a distal end of an injection assembly in FIG. 4.

In FIG. 5A, an embodiment of the collector 70 and the injector head 52 is shown in an enlarged cross-sectional view with a bypass conduit 56 (e.g., tube) inside. In one embodiment, the collector 70 and the injector head 52 are coupled to each other and in fluid communication via the bypass conduit 56. In addition, a portion of the bypass conduit 56 can extend into the collector 70 and a portion of the bypass conduit 56 can extend into the injector head 52. In one embodiment, the bypass conduit 56 can be a curved rigid pipe portion, but other coupling devices known in the art may also be used.

Advantageously, the bypass conduit 56 directs liquid flow into the collector 70 that dilutes the abrasive material coming into collector 70 and helps drive the flow of abrasive material and water up the third flow line 60 and into the EHC tank 10. That is, when water flows from the pump 30 to the second flow line 50, at least a portion of that flow is redirected into the collector 70. This redirected flow adds an additional force to drive the abrasive material from the collector 70 through the third flow line 60 at an increased velocity. For example, this can decrease the time needed to fill the EHC tank 10 with abrasive material from approximately 4 hours to about 2.5 hours, or less.

Figure 5B:
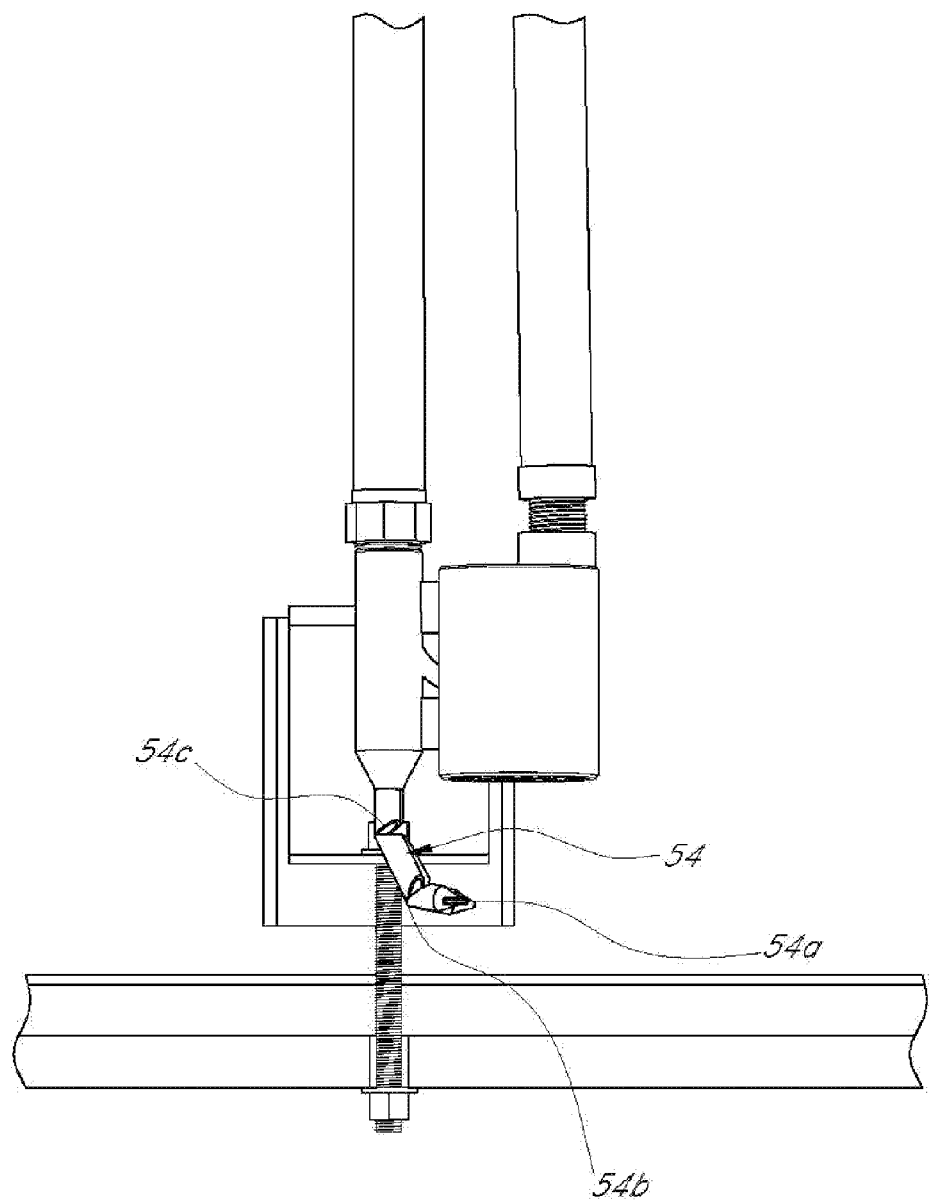
FIG. 5B is an enlarged front view of the injection assembly in FIG. 5A.

In FIG. 5B, the front view of the collector 70, injector head 52, and nozzle unit 54 is shown. In one embodiment, the nozzle unit 54 comprises at least two nozzles located at a distal end of injector head 52. Nozzle unit 54 operates to unsettle abrasive material and drive the flow of water in a desired direction. Preferably, the nozzle unit 54 can include sectioned-off grooves or openings 54b, 54c that direct the flow of water in different directions. At a nozzle end 54a, a portion of water flow is delivered in a direction (e.g., substantially transverse to the collector 70) to unsettle the abrasive material. At the groove or opening 54b, a portion of water flow is delivered in a direction (e.g., substantially longitudinal to the collector 70) toward the collector 70 to help drive the unsettled abrasive material into the collector 70 and through the third flow line 60. At groove or opening 54c, a portion of water flow is delivered in a direction (e.g., substantially transverse to the collector 70) to help unsettle more of the abrasive material proximate to the collector 70. The structure of the nozzle unit 54 advantageously operates to efficiently unsettle abrasive material and direct it to and through the collector 70.

In FIG. 6, a cross-sectional view taken along line 6-6 of FIG. 3 is shown, illustrating the first flow passage 36 and the second flow passage 38 as discussed above. In one embodiment, second flow passage 38 is a T-junction pipe with outlet passages 38a and 38b. Outlet passages 38a, 38b can be directed towards the aperture(s) 25 so that water can strike and clean the windows of the aperture(s) 25 during the pre-charge process. Additionally, as discussed above, the first flow passage 36 can have a bore 36a (e.g., air relief hole) proximate to the top end 10b of the EHC tank 10. The bore 36a can facilitate the venting of air in the EHC tank 10 as water is removed from the EHC tank 10 via first flow passage 36, valve 32a, fluid line 34a, and pump 30 (e.g., air that may be trapped in the EHC tank 10 above the end of the flow passages 36, 38, or directed into the EHC tank 10 via the third flow line 60).

Furthermore, the bore 36a is sized to allow a sufficient flow of air from the inside of the EHC tank 10 through the first flow passage 36 and pump 30 to ensure air does not build up within the EHC tank 10 to the point where there is no fluid connection (e.g., no closed loop connection) between the EHC tank 10 and the water jet EHC tank via the flow lines 50, 60, which can occur if an amount of air accumulates in the EHC tank 10 that drops the water level in the EHC tank 10 below the end of the first flow passage 36. However, the bore 36a is preferably sized so as to not allow so much air to flow through the first flow passage 36 and pump 30 that causes the pump 30 to fail (e.g., cavitate). In one embodiment, the bore 36a has a diameter of about ⅛ inch. However, in other embodiments the bore 36a can have a diameter of greater or less than ⅛ inch, such as 1/16 inch or 3/16 inch.

Also in FIG. 6, one or more seals 18 can be disposed on EHC tank 10 so that the seals 18 come in contact with the door 14 when the door 14 is in the closed position. Preferably, the seals 18 inhibit the contents in the EHC tank 10 from leaking out of the bottom end 10a when the door 14 is in the closed position (e.g., the seals 18 prevent the leakage of water or abrasive material through the interface between the bottom door 14 and the EHC tank 10). In one embodiment, the seals 18 are gaskets. However, a person of ordinary skill in the art may use other seals to prevent the leakage of water or abrasive material.

With continued reference to FIG. 6, the extraction EHC tank 10 can include a pair of forklift receivers 12a, 12b that define slots on opposite sides of the EHC tank 10 to removably receive the forks of a forklift (not shown), thereby allowing the extraction EHC tank 10 to be portable and easily transported as desired (e.g., to different extracting locations, to a dump site to dispose of the extracted material from the extraction EHC tank 10). However, in other embodiments the EHC tank 10 does not include the forklift receivers 12a, 12b and can be transported to a desired location via other suitable mechanisms.

Figure 7:
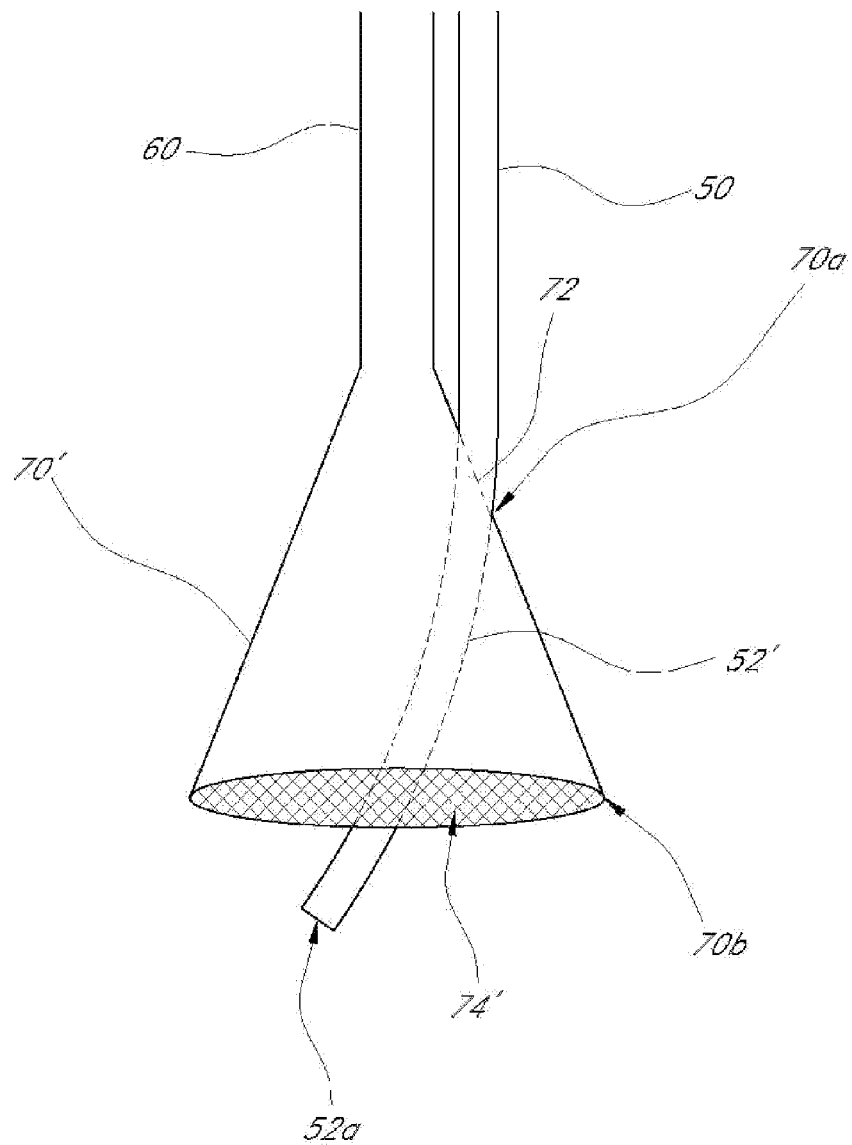
FIG. 7 is an enlarged schematic front view of another embodiment of a distal end of an injection assembly of a system for extracting particulate material from a body of liquid.
Figure 8A:
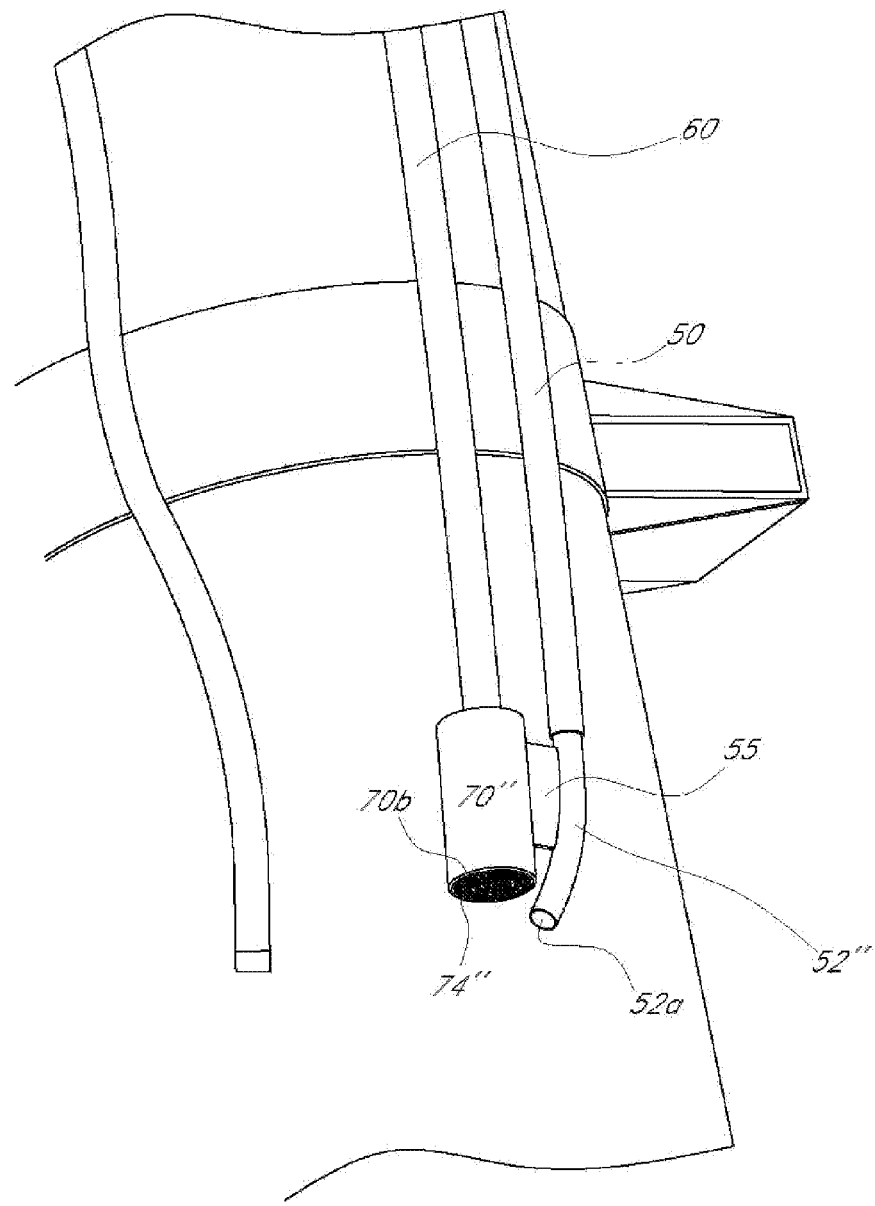
FIG. 8A is an enlarged perspective view of another embodiment of a distal end of an injection assembly of a system for extracting particulate material from a body of liquid.
Figure 8B:
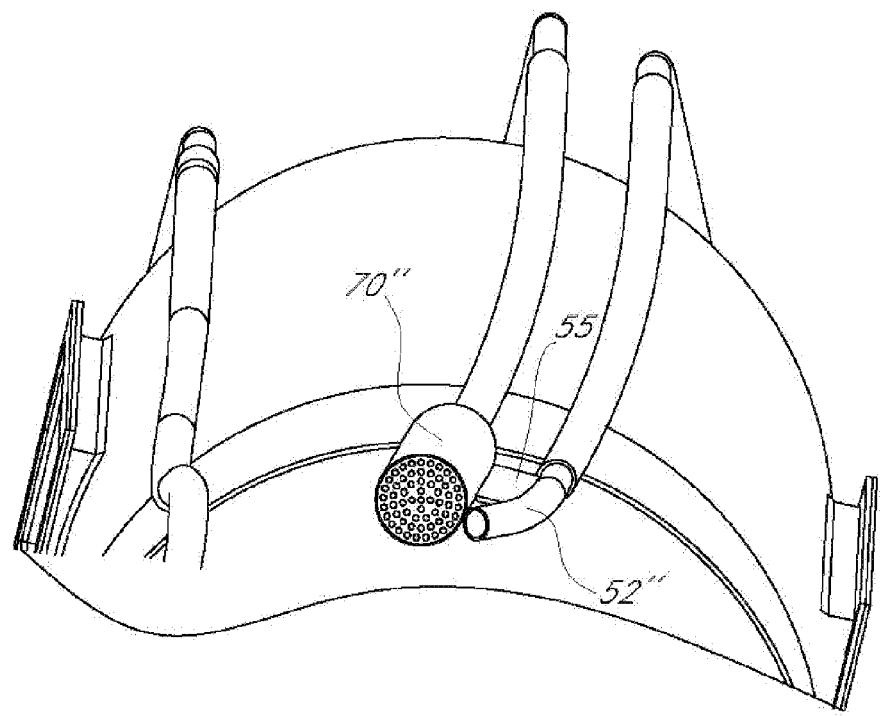
FIG. 8B is an enlarged bottom view of the distal end of the injection assembly of FIG. 8A.

In FIG. 7, another embodiment of the collector 70' and the injector head 52' for the extraction EHC tank 10 is shown. The system includes an injector head 52' coupled to the second flow line 50. In addition, there is a collector 70' that is coupled to the third flow line 60. The collector 70' can include a filter 74' at a distal portion 70b of the collector 70'. In one embodiment, the filter 74' can be porous so as to regulate and filter the uptake of abrasive material during suction. The injector head 52' can be positioned relative to a collector 70' as discussed below. The injector head 52' can extend through an opening 72 in a proximal portion 70a of the collector 70'. In one embodiment, the injector head 52' can have a distal portion 52a that extends past a distal portion 70b of the collector 70'. In another embodiment, the injector head 52' and the collector 70' are coupled via a flange 55, as illustrated in FIGS. 8A and 8B. However, in another embodiment, the injector head 52' and the collector 70' can be separate from each other (e.g., not connected). Moreover, the injector head 52' can include one or more filter nozzles 54.

Additionally, a distal end 62 of the third flow line 60 can likewise be coupled to the proximal portion 70a of the collector 70'. In one embodiment the filter 74 can be disposed over an opening of the distal portion 70b of the collector 70'. In one embodiment, the collector 70' can be cone-shaped. In another embodiment, the collector 70' can be cylindrical-shaped. However, in other embodiments, the collector 70' can have other suitable shapes. The collector 70' can be made of metal in one embodiment. In another embodiment, the collector 70' can be of plastic or another suitable material.

Additionally, the system 100 can include a handle (not shown) coupled to one or both of the second and third flow lines 50, 60. The handle can be used to move the collector 70 to a desired location, as well as to reposition the injector head 52 relative to the collector 70.

In FIGS. 8A and 8B, another embodiment of a collector 70" and an injector head 52" is shown. The injector head 52"

is coupled to the second flow line 50 and the collector 70" is coupled to the third flow line 60. In the illustrated embodiment, the collector 70" has a generally cylindrical shape. However, the collector 70" can have other suitable shapes. The collector 70" includes a filter 74" at the distal end 70b of the collector 70". In the illustrated embodiment, the distal end 52a of the injector head 52" extends forward of the distal end 70b of the collector 70". Additionally, the injector head 52" and collector 70" can be coupled via a flange 55.

In operation, the EHC tank 10 is first filled with water from a body of liquid (e.g., water jet EHC tank) as follows. Initially, removable caps 15a, 15b are fastened to the top end 10b of EHC tank 10. The first flow line 40 is placed below the water level of the body of liquid (e.g., water jet EHC tank). The second flow line 50 and the third flow line 60 are placed away from EHC tank 10 and proximate to the body of liquid. From there, valves 32a, 32b are set to a pre-charge position, as discussed above. The first valve 32a is actuated to place the first flow line 40 in fluid communication with the pump 30 via the first valve 32a and first fluid line 34a, and the second valve 32b is positioned so that the second flow line 50 is isolated from the pump 30 and the pump 30 is in fluid communication with the inside of the EHC tank 10 (e.g., via the second flow passage 38). The pump 30 is operated to pump water from a body of liquid to the EHC tank 10 via the first flow line 40, first valve 32a, and first fluid line 34a. The air supply hose 44 is connected to the air pressure regulator 42 so that the pump 30 is in fluid communication with the air pressure regulator 42. An air pressure source is also coupled to the air pressure regulator 42 to supply pressurized air to the pump 30. Air is turned on to begin precharge so that water is pulled up first flow line 40 through first fluid line 34a via first valve 32a being drawn into pump 30 and discharged through lines 34b and 32b into the EHC tank 10. Water enters the EHC tank 10 via the second flow passage 38 and through outlet passages 38a, 38b.

Once the EHC tank 10 is filled with water, which can be ascertained when water flows through the third flow line 60 and collector 70, precharge is complete. At this point, the collector 70 and the injector head 52 are placed below the water level of a body of liquid, and preferably below the level of particulate material in the body of liquid. The first valve 32a is positioned to isolate the first flow line 40 from the pump 30 and place the EHC tank 10 in fluid communication with the pump 30 via the first flow passage 36, first valve 32a, and first fluid line 34a. Additionally, the second valve 32b can be actuated to place the pump 30 in fluid communication with the second flow line 50 via the second fluid line 34b and second valve 32b, while isolating the pump 30 from the second flow passage 38. The pump 30 is then operated to pump water from the EHC tank 10 through the first flow passage 36, first valve 32a, first fluid line 34a and into the second flow line 50 via the second fluid line 34b and the second valve 32b to the injector head 52, which directs the water to the abrasive material to displace the abrasive material from a body of liquid.

As discussed above, the injector head 52 uses nozzle unit 54 to deliver water in a desired direction and displace the particulate material (e.g., abrasive material, such as garnet). The displaced particulate material is suctioned through the filter 74, collector 70, and third flow line 60 into the EHC tank 10 via the suction force created by the flow of water from the EHC tank 10 to the pump 30. In one embodiment, the collector 70 and injector head 52 are submerged in the particulate material of a body of liquid. Additionally, in one embodiment, suction of the particulate material into the EHC tank 10 begins when about 10 inches of vacuum is achieved by the pump 30, as measured by meters on the EHC tank 10. Vacuum pressure is measured by the pressure gauge 13. Further, the flow of particulate material through collector 70 and third flow line 60 into the EHC tank 10 is aided by the bypass conduit 56, which redirects a portion of water from the injector head 52 to the collector 70. The combination of the suction force from the pump 30, the directed delivery of water from the nozzle unit 54, and the redirected water flow from the bypass conduit 56 function to draw or suck particulate material through the third flow line 60 and into the EHC tank 10. As the particulate material and water enter the EHC tank 10 via third flow line 60, the velocity of the suctioned water and particulate material slows down so that the abrasive material can be collected in the EHC tank 10.

The system 100 provides an effective way to drain the EHC tank 10 of excess water when the EHC tank 10 is substantially full of abrasive material. Removable caps 15a and 15b are taken off from the top end 10b so that the first flow line 40 can be placed through the opening of where either cap 15a or 15b was fastened. Valve 32a is set to a precharge position and excess water drawn from EHC tank 10. The flow of water travels from first flow line 40 through first fluid line 34a via valve 32a to pump 30. The pump 30 pumps the water through second fluid line 34b to second flow line 50 via second valve 32b. The water is discharged out of injector head 52 and into a body of liquid (e.g., water jet EHC tank). This may be done until the EHC tank 10 is sufficiently drained of excess water.

Furthermore, the system 100 can effectively dispose of extracted abrasive material by moving bottom door 14 into an open position via coupling mechanism 16. The EHC tank 10 can be transported using a forklift to an appropriate location and positioned over a receptacle, container, dump site, or other disposal area. Locking member 22 is loosened and latch 24 is removed from the EHC tank 10. From there, the pressure release valve 16e is opened on the hydraulic pump 16c to allow the hydraulic cylinder 16b to retract via the hydraulic pump fluid line 16c. This causes the bottom door 14 to open relative to the EHC tank 10, pulling away from the seals 18 and causing extracted abrasive material to fall out of the EHC tank 10. Any abrasive material remaining on the bottom door can be manually removed by a user. To close the bottom door 14, a user pumps the pressure release valve 16e on hydraulic pump 16c to produce pressure on hydraulic cylinder 16b.

Figure 9:
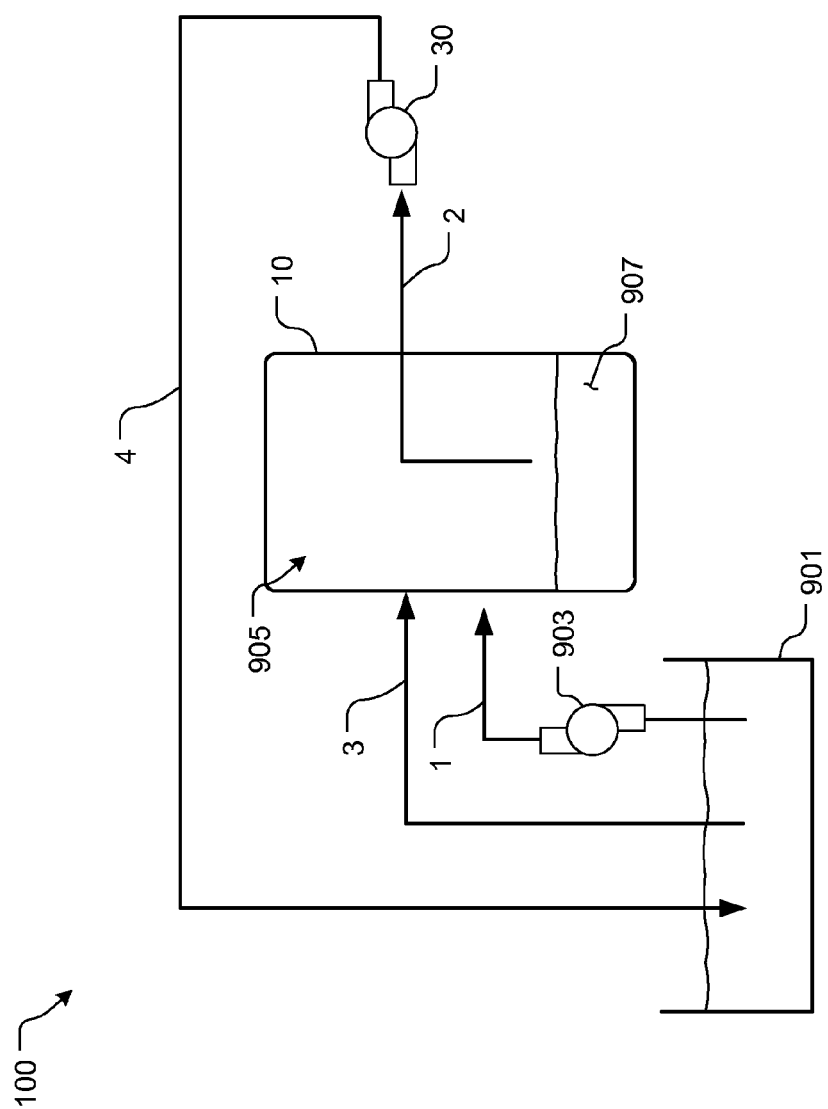
FIG. 9 is a simplified schematic of the extraction system of FIG. 1.

Referring now FIG. 9, a simplified schematic of the operation of system 100 is shown. As depicted, during the precharge process, the extraction EHC tank 10 is initially filled with water and particulate material from a fluid reservoir 901. This can be accomplished by actuating of one or more of the valves 32a-32b so that water can be pumped by the pump 30 and/or a pump 903 from reservoir 901 to the extraction EHC tank 10 via the first fluid line 1, e.g., flow line 40.

Once the extraction EHC tank 10 has been filled with water, the air is substantially removed from an inner chamber 905 formed by the body of EHC tank 10. Thus, after the pre-charge process, the EHC tank is substantially air tight and filled with water and particulate matter. It should be appreciated that the air in the EHC tank 10 can advantageously be vented from the EHC tank 10 through the first flow passage 36 and pump 30 via at least one bore 36a (e.g., air relief hole) (see FIG. 6) in the first flow passage 36.

As shown, the fluid carried within the EHC tank 10 is drawn out in fluid line 2, e.g., flow line 50, in fluid communication with pump 30. The particulate material and the fluid are then drawn from fluid line 3, which in turn causes circulation in fluid line 4.

Advantageously, the system 100 operates as a closed-loop system wherein the volume of water that is pumped out of the extraction EHC tank 10 into the fluid reservoir 901 is substantially equal to the volume of water and abrasive material that is drawn or suctioned from the water jet EHC tank into the extraction EHC tank 10. This allows the extraction EHC tank 10 to remain filled with water and substantially air-tight at all times, so that the flow of water, which slows upon entry into the extraction EHC tank 10 can allow the abrasive material to settle at the bottom of the EHC tank 10.

One of the unique features believed characteristic of the present application is the ability to drawn the particulate material with a pump, yet keep the particulate material from reaching the pump. For example, the particulate material and fluid is drawn into the extraction EHC tank 10 without passing through the pump 30, thereby inhibiting damage to the components of the pump 30 due to contact the particulate (e.g., abrasive) material, which improves the reliability and life span of the system 100.

It should be understood that the flow of water and particulate material enters the extraction EHC tank 10 and the velocity of the water flow slows down due to the difference in diameter of the third flow line 60 and extraction EHC tank 10. This slowdown in the flow rate of the water that enters the extraction EHC tank 10 allows substantially all of the particulate material flowing with the water to settle at the bottom of the extraction EHC tank 10. In one embodiment, the collector 70 can include a filter 74 at a distal end thereof. In one embodiment, the filter 74 can be a screen filter.

The system 100 can be operated until the extraction EHC tank 10 is substantially filled with abrasive material. In one embodiment, the extraction EHC tank 10 can have aperture 25 shown in FIG. 1 that allows a user to determine how full the extraction EHC tank is to decide when to end the extraction operation.

Accordingly, the system 100 advantageously provides an effective system for removing abrasive material 907 from fluid reservoir 901 that avoids the problem of pumping the abrasive material through a pump, which can damage the pump. Additionally, the system 100 provides a compact and portable device for extracting abrasive material from a water jet EHC tank, which can be used to remove abrasive material from more than one water jet EHC tank. In addition, the extraction EHC tank 10, as discussed above, can readily be opened to dispose of the collected abrasive material (e.g., at a dump site). Further, to save time, the system 100 enables a user to extract garnet while simultaneously operating a water jet cutter or performing other industrial applications.

Figure 10:
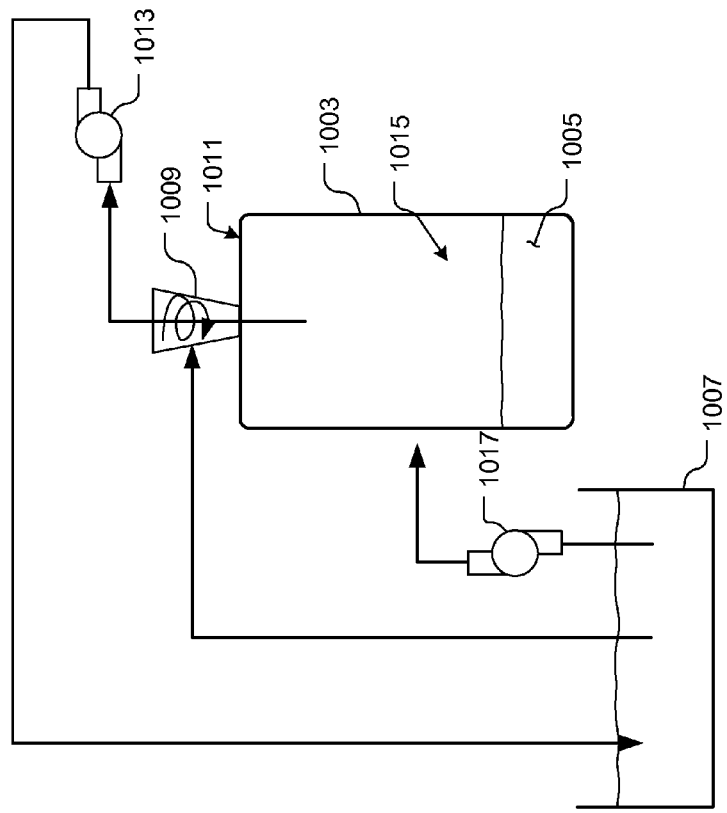
FIG. 10 is a simplified schematic of an extraction system in accordance with an alternative embodiment of the present application.

In FIG. 10, a simplified schematic of an extraction system 1001 is shown in accordance with an alternative embodiment of the present application. It will be appreciated that system 1001 is substantially similar in form and function to one or more of the extraction systems discussed above and incorporate the features discussed herein.

System 1001 includes a EHC tank 1003 configured to collect particulate matter 1005 from a fluid reservoir 1007. To achieve this feature, system 1001 utilizes a cross-flow separator under vacuum (CFSUV) 1009 positioned on a top surface area 1011 of EHC tank 1003 and configured to separate the particulate matter from the fluid from reservoir 1007. Further detailed description of these features is provided below with reference to FIG. 11.

System 1001 is further provided with a pump 1013 in fluid communication with the inner EHC tank chamber 1015 and in fluid communication with reservoir 1007. Accordingly, as depicted, the system 1001 forms a closed-loop system, wherein the fluid passes through one or more fluid lines, valves, and the like, from EHC tank 1003 and reservoir 1007 via pump 1013.

During the pre-charge process, a pump 1017 is utilized to fill the inner chamber 1015 with fluid, which in turn allows the pump 1013 to circulate the fluid through the closed loop system. It will be appreciated that pump 1013 could be used in lieu of pump 1017 to pre-charge the system, which can easily be achieved through one or more valves associated with the fluid pipes.

It should be appreciated that the only a small, if any, amount of particulate matter leaves the fluid chamber 1015, thus preserving the lifespan of pump 1013. It should be understood that the particulate matter has the potential to cause wear and tear on the components of pump 1013. As such, it is highly advantageous to place the pump 1013 in a fluid location the particulate matter is separated from the fluid such that merely fluid enters into the pump.

Figure 11:
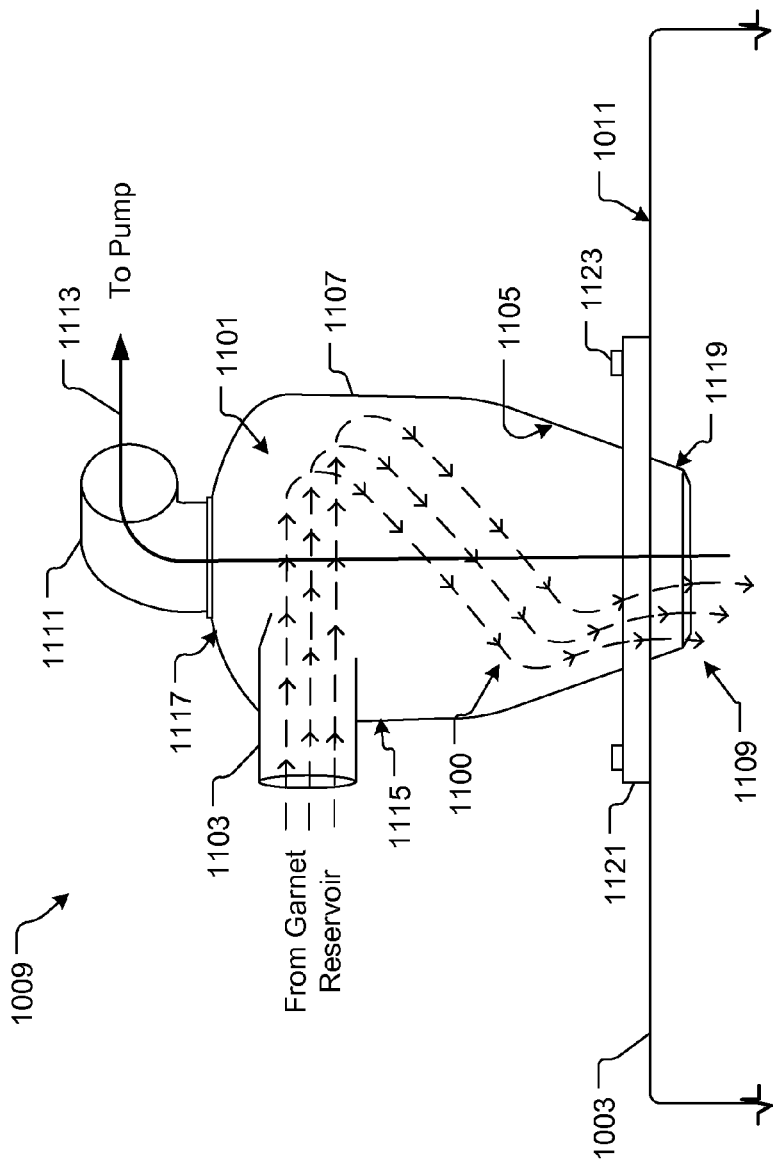
FIG. 11 is a front view of the separator of the system of FIG. 10.

In FIG. 11, further detailed features of separator 1009 are illustrated. It will be appreciated that one of the unique features believed characteristic of system 1001 is the use of separator 1009 to separate the fluid from the particulate matter. To achieve this feature, the fluid and particulate matter, as depicted with a plurality of dashed-lined arrows 1100 enters within the contoured cylindrical chamber 1101 via an inlet 1103, spirals along the inner surface 1105 of the body 1107. During the cyclonic spiraling movement, the heavier particulate matter is separated from the fluid, which in turn exits through a bottom opening 1109 and into the chamber 1015 of EHC tank 1003.

Separator 1009 further includes a second opening 1111 configured to channel the fluid to pump 1013, as indicated by arrow 1113. In the exemplary embodiment, inlet 1103 is selectively positioned about a side surface area 1115 of the body, while opening 1111 is positioned about a top end 1117 and the bottom opening 1109 is positioned about a bottom end 1119, wherein top end 1117 and bottom end 1119 oppose each other. Accordingly, separator 1009 is configured such that specific gravity is used to separate the fluid from the particulate matter.

In the preferred embodiment, separator 1009 is secured to top surface 1011 via a flange 1121 attached to and extending from body 1107, which in turn is secured to the top surface via a plurality of fasteners 1123, e.g., threaded bolts.

Figure 12:
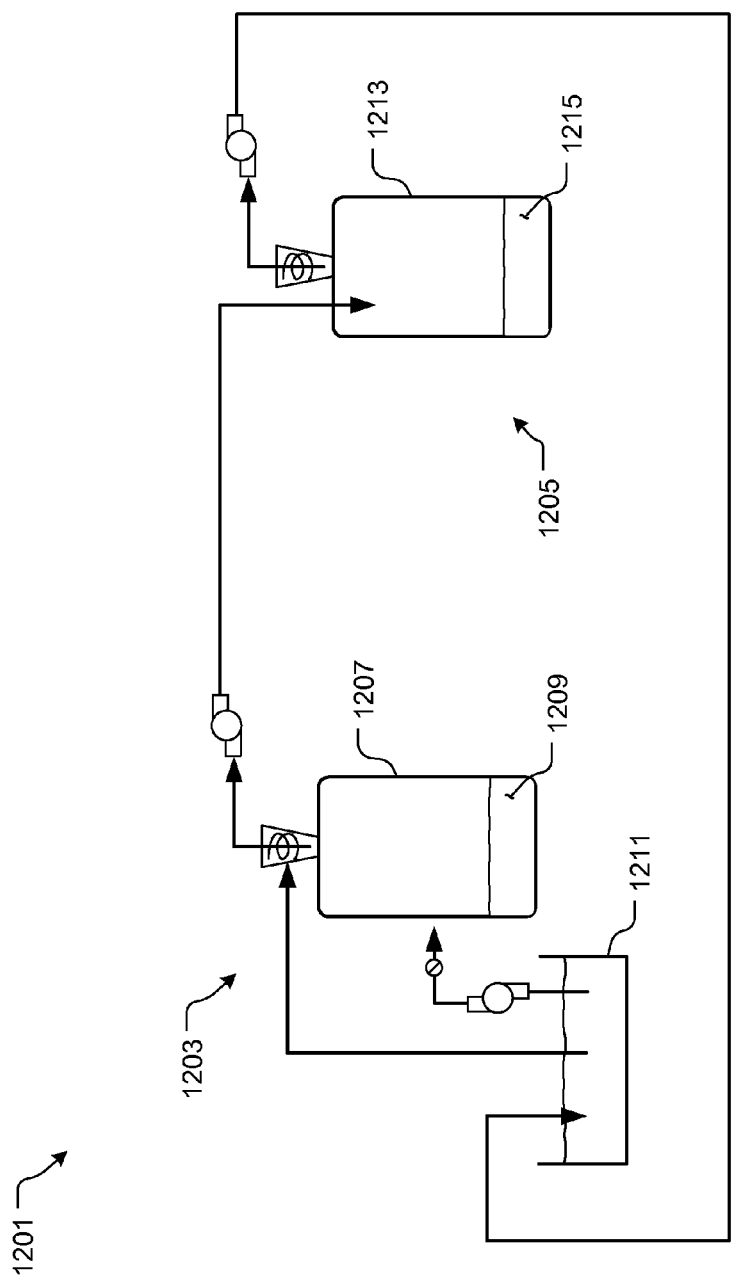
FIGS. 12 and 13 are simplified schematics of extraction systems in accordance with alternative embodiments of the present application.

Referring now to FIG. 12, a system 1201 is depicted having a plurality of extraction systems, specifically, the embodiments of extraction systems 1001, in fluid communication with each other. It should be understood that not all particulate matter separates during the extraction process and that finer particulate matter can be harvested in a second extraction EHC tank in accordance with the exemplary embodiment shown.

As depicted, system 1201 includes a first system 1203 in fluid communication with a second system 1205. It will be appreciated that the features of one or more of the extraction systems discussed above are hereby incorporated in system 1201. Thus, system 1203 includes a EHC tank 1207 configured to capture particulate matter 1209 from a fluid reservoir 1211. Thereafter, the fluid is channeled to system 1205. System 1205 includes a EHC tank 1213 configure to capture and store finer particulate matter 1215 system 1203. The fluid from system 1205 is then channeled back to reservoir 1211 to form a closed loop system. It will be appreciated that the fluid and particulate matter captured in fluid reservoir is a much finer material than the particulate material carried within fluid reservoir 1211.

Figure 13:
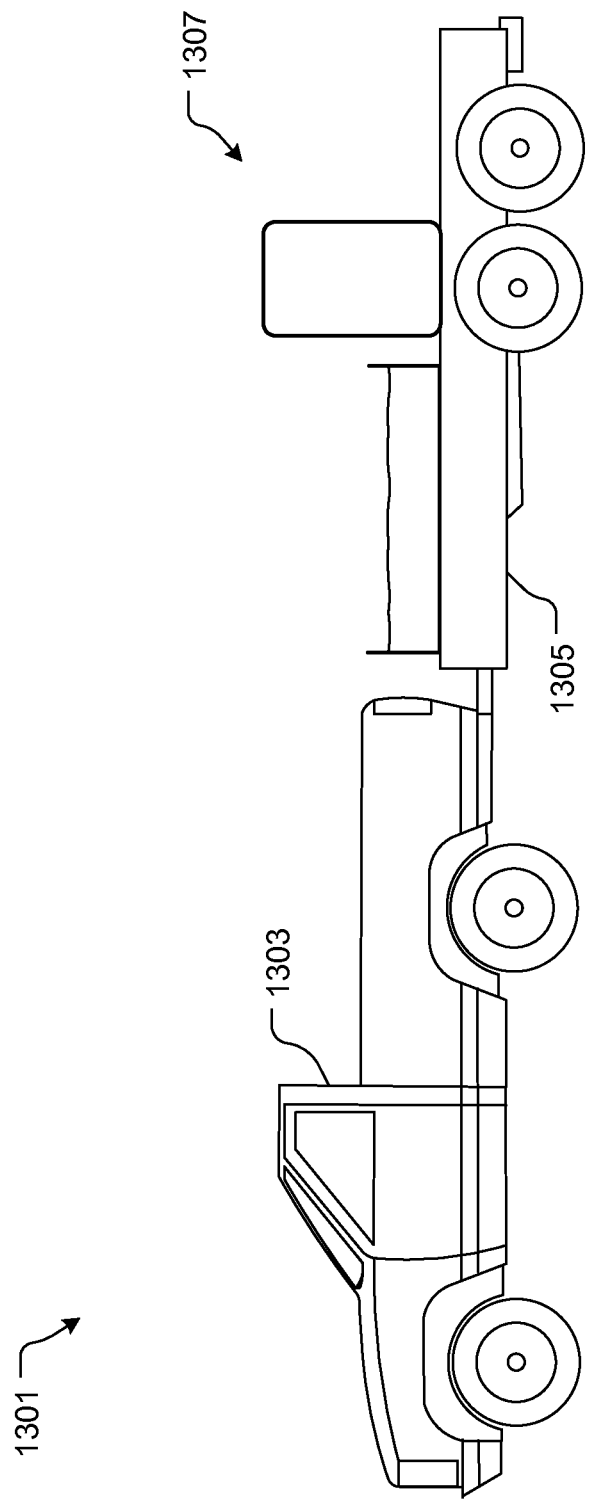

FIG. 13 depicts yet another alternative embodiment contemplated. System 1301 includes a vehicle 1303 and a trailer 1305 configured to carry extraction system 1307. It will be appreciated that system 1307 is substantially similar in form and function to one or more of the extraction systems discussed above and incorporates the features discussed herein.

In the exemplary embodiment, it is contemplated carrying system 1307 via trailer 1305, thus allowing the extraction system 1307 to be mobile. This feature allows the user to transport the extraction system to various locations wherein the use of system 1307 is required and remove the trailer shortly after the extraction process.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. For example, the embodiments disclosed herein are not limited to the extraction of abrasive materials used in water jet cutting applications, but can be employed in the extraction of any particulate material from a liquid body (e.g., dredging operation, industrial particulate material extraction processes). In addition, though the material drawn from a EHC tank or body of water is referred to as a particulate material, the material is not limited to an abrasive material (e.g., garnet), but can include other particulate material (e.g., shavings from water jet operation). Further, the term particulate is not meant to limit the material drawn into the extraction EHC tank 10 to a particular size or shape, and merely describes that the material drawn into the EHC tank 10 can be in the form of grains (e.g., loose or clumped grains), elongated shavings, or other generally separable particulate slurry. In addition, while a number of variations of the inventions have been shown and described in detail, other modifications, which are within the scope of the inventions, will be readily apparent to those of skill in the art based upon this disclosure. For example, separate pumps can be used to precharge the EHC tank 10 with water and to operate the extraction system 100. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method for using an extractor system to extract particulate material from a liquid tank, comprising:
    inserting a first conduit into a liquid tank, the first conduit coupled to a pump via a three-way valve;
    inserting an outflow line into the liquid tank, the outflow line comprising one or more nozzles having a distal end;
    inserting an inflow line into the liquid tank, the inflow line comprising a collector having a distal end, the collector and the one or more nozzles being proximate each other; and
    operating the pump to pump liquid from an extractor tank through an outflow line out of the one or more nozzles to unsettle the particulate material, the particulate material drawn through the collector and the inflow line into the extractor tank without passing through the pump, wherein the inflow line, the outflow line, and the extractor tank define a closed system.

2. The method of claim 1, wherein operating the pump comprises directing at least a portion of liquid from the outflow line to the collector through a bypass conduit.

3. The method of claim 1, wherein operating the pump comprises directing at least a portion of liquid from the one or more nozzles through a plurality of grooves, the plurality of grooves configured to direct at least a portion of liquid in a desired direction.

4. The method of claim 1, wherein inserting the outflow line and inserting the inflow line occurs simultaneously.

5. The method of claim 1, further comprising draining the extractor tank of excess liquid, comprising:
    inserting the first hose into the extractor tank through an opening in the extractor tank;
    drawing liquid through the first hose to the pump via the three-way valve; and
    operating the pump to pump liquid through the outflow line into the liquid tank until the extractor tank is substantially drained of excess liquid.

* * * * *